Nov. 7, 1933.   H. F. FELLOWS   1,933,622
TRAILER FIFTH WHEEL AND COUPLING CONSTRUCTION
Filed Dec. 14, 1931   4 Sheets-Sheet 1
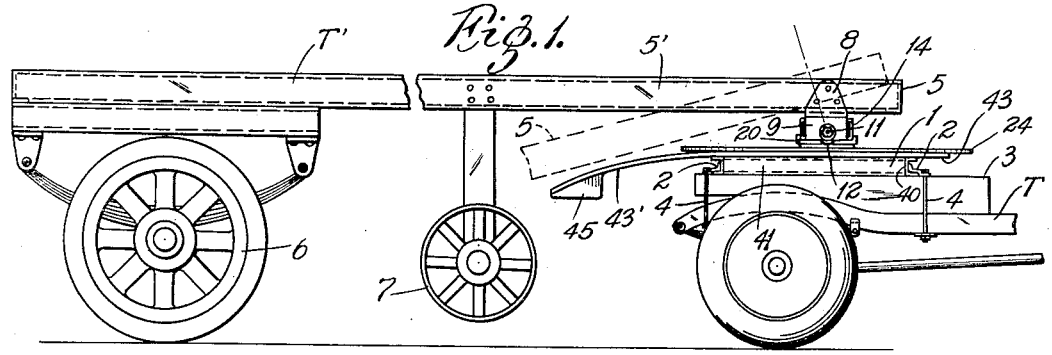
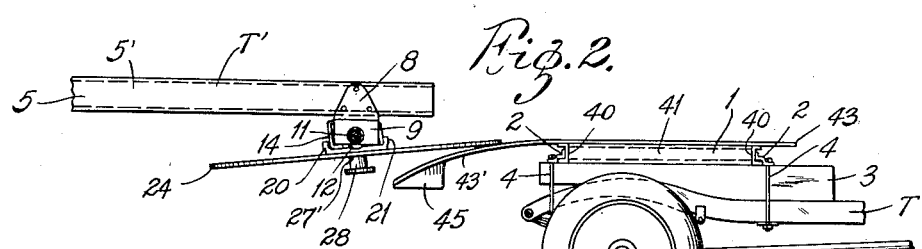
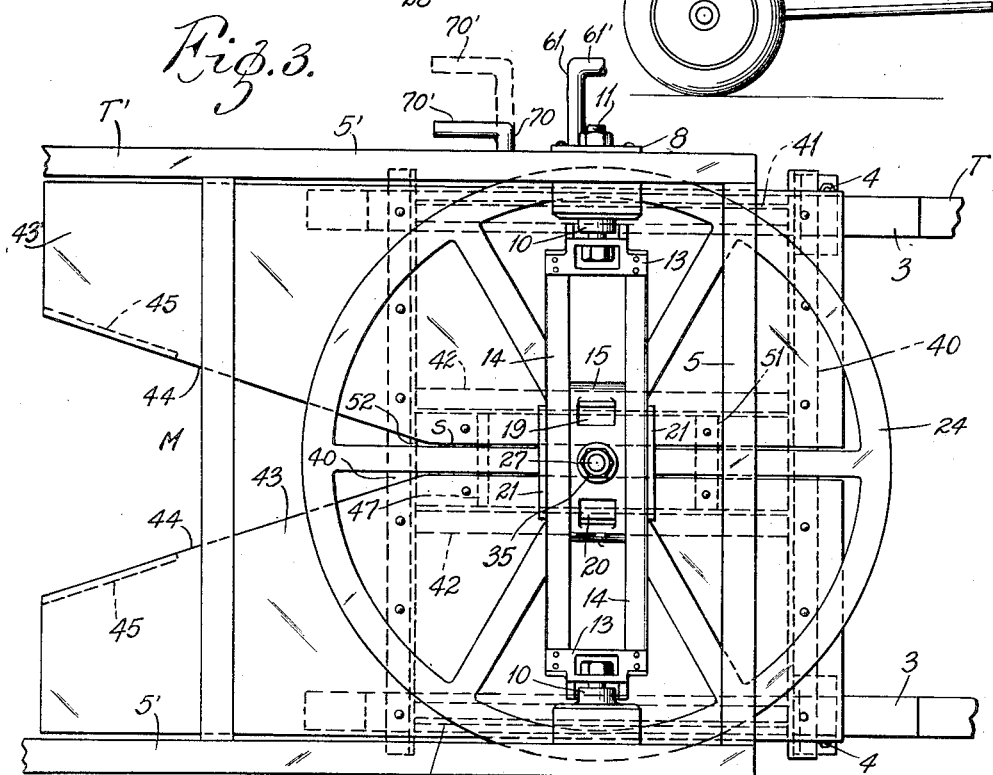
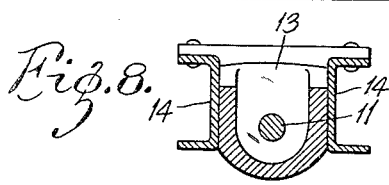
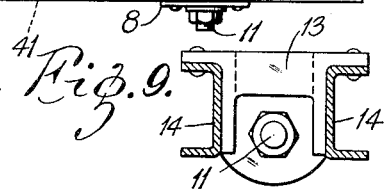
INVENTOR:
HOMER F. FELLOWS.
Harry C. Berner
ATTORNEY

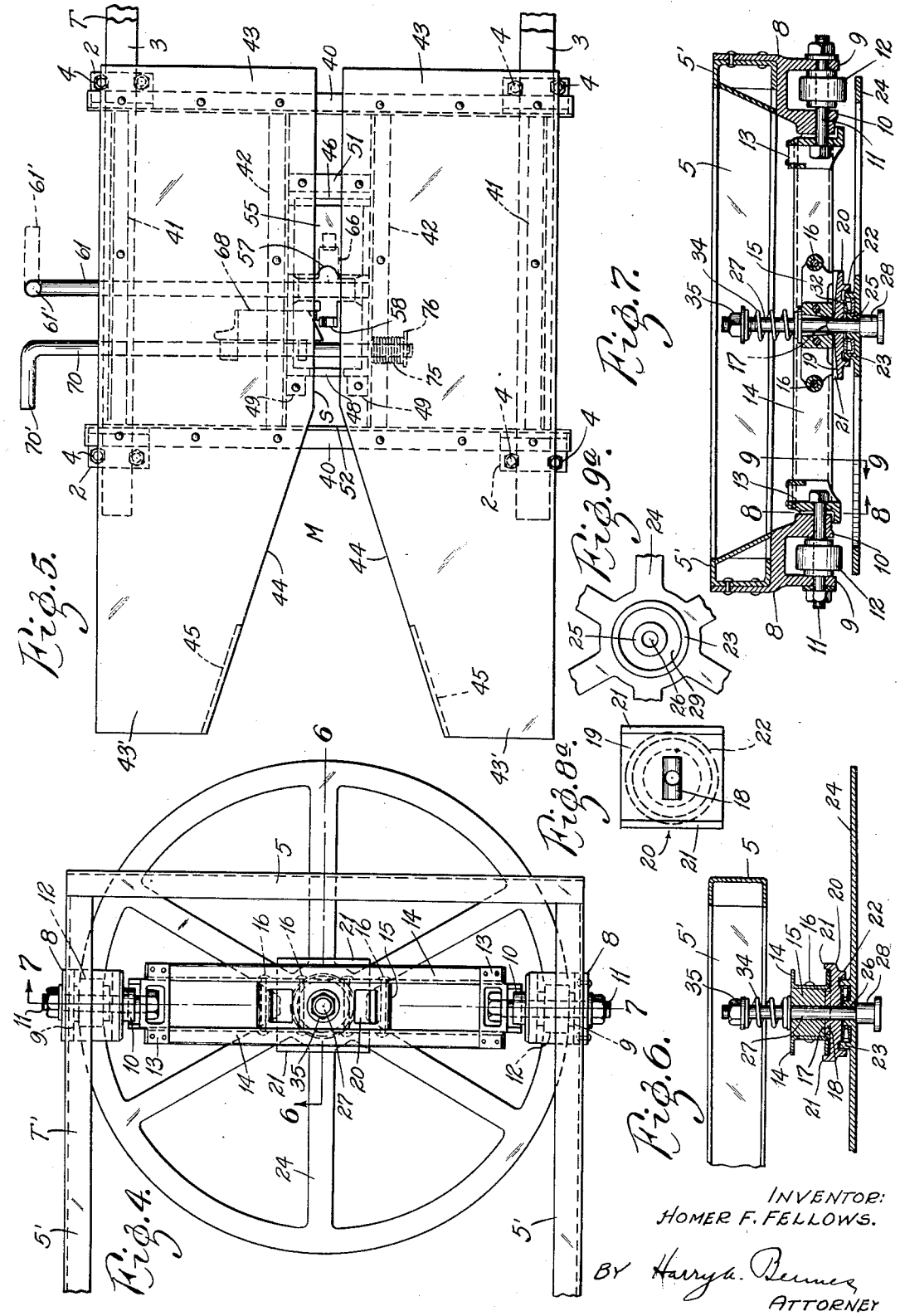

Nov. 7, 1933.   H. F. FELLOWS   1,933,622
TRAILER FIFTH WHEEL AND COUPLING CONSTRUCTION
Filed Dec. 14, 1931   4 Sheets-Sheet 3
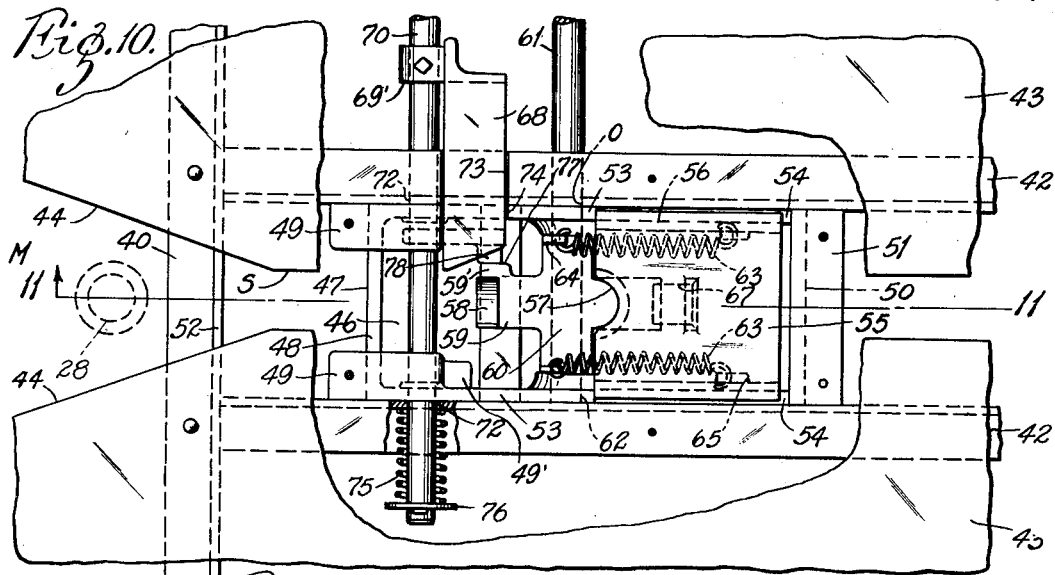
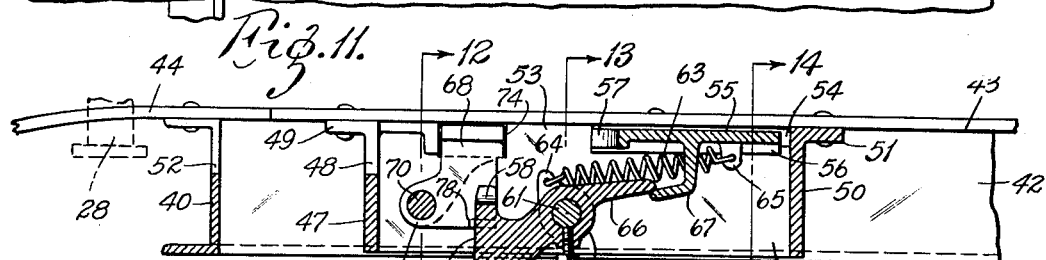
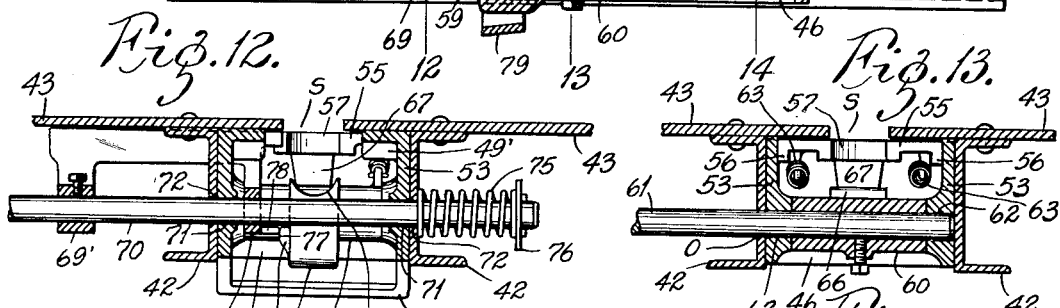
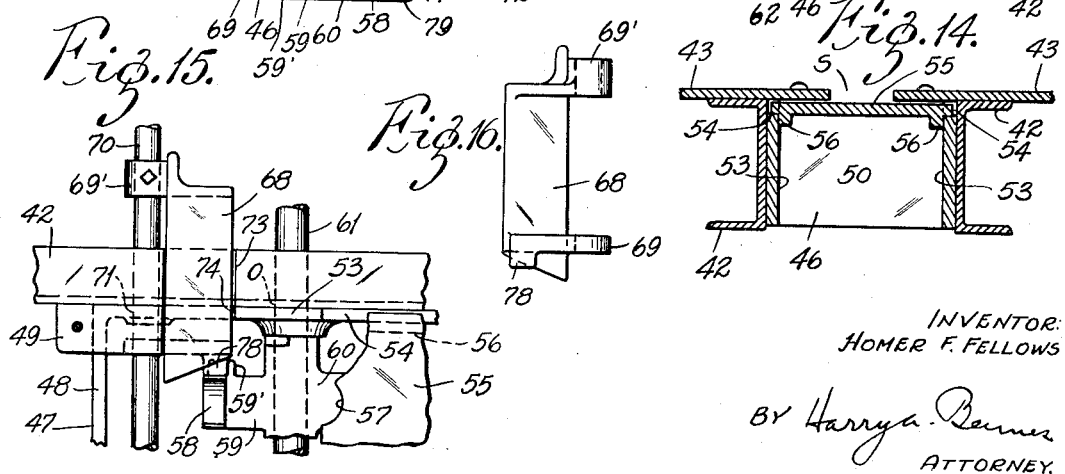
INVENTOR
HOMER F. FELLOWS
BY Harry A. Berner
ATTORNEY.

Nov. 7, 1933.                H. F. FELLOWS                 1,933,622
              TRAILER FIFTH WHEEL AND COUPLING CONSTRUCTION
                      Filed Dec. 14, 1931           4 Sheets-Sheet 4
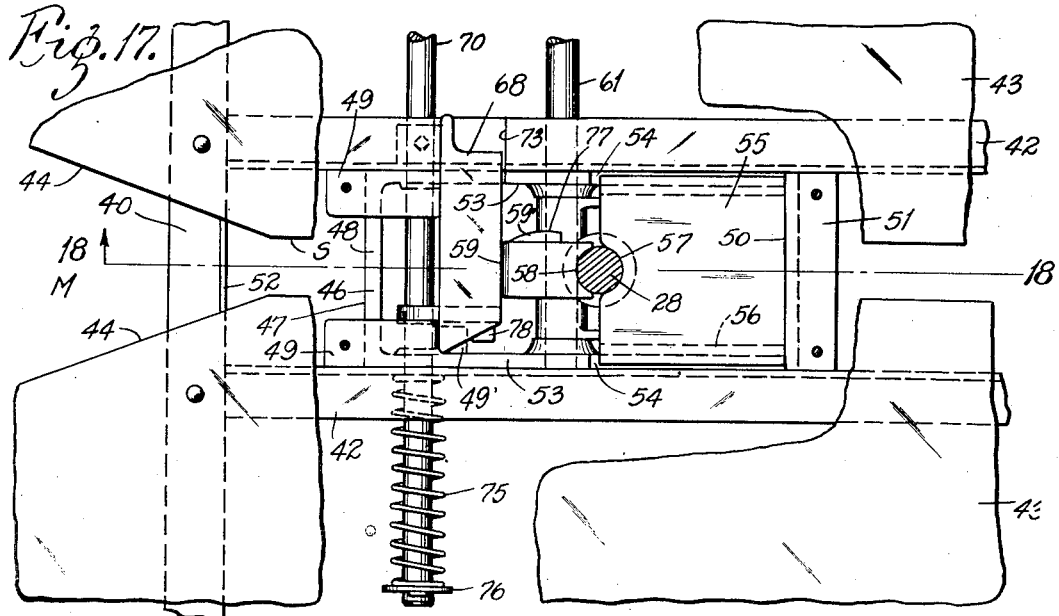
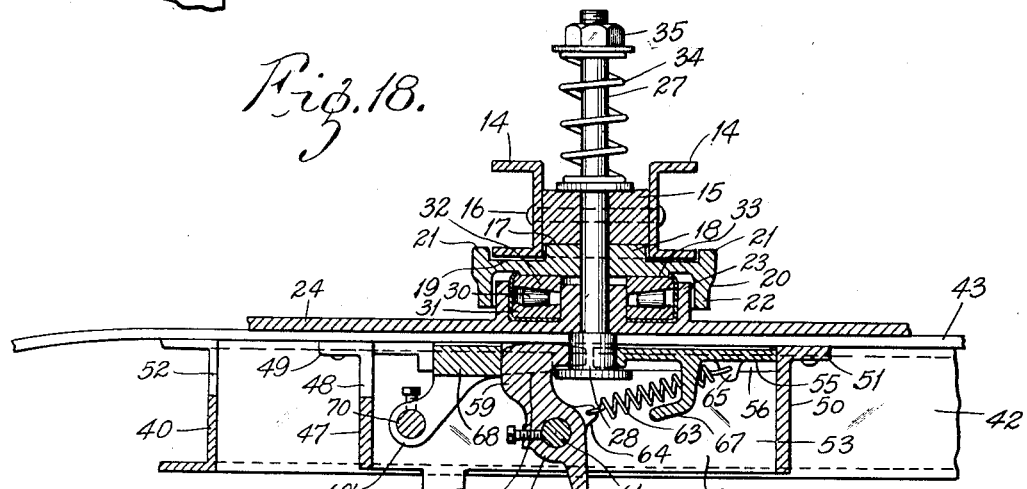
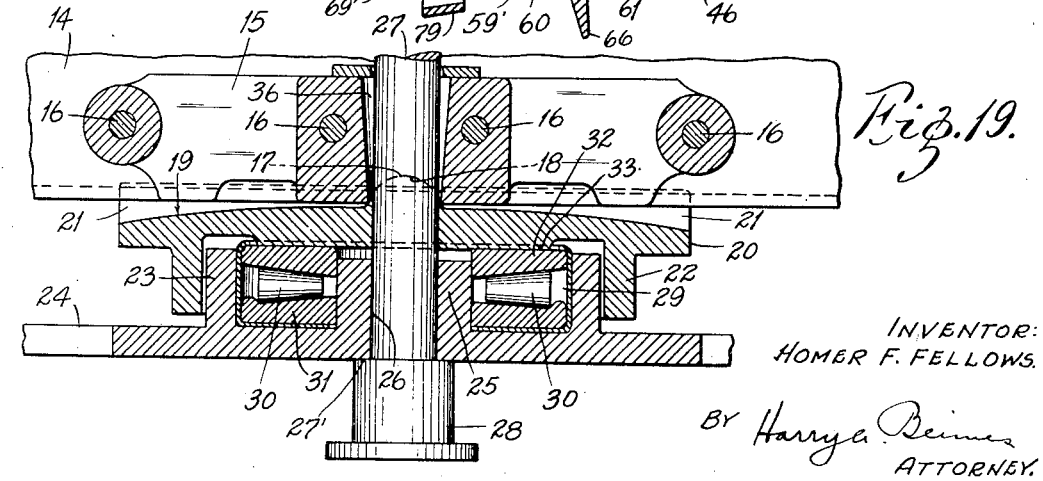
INVENTOR:
HOMER F. FELLOWS.
BY Harry A. Beimes
ATTORNEY.

Patented Nov. 7, 1933

1,933,622

UNITED STATES PATENT OFFICE 1,933,622

TRAILER FIFTH WHEEL AND COUPLING CONSTRUCTION

Homer F. Fellows, Springfield, Mo.

Application December 14, 1931
Serial No. 580,791

2 Claims. (Cl. 280—33.1)

My invention has relation to improvements in motor vehicle trailer fifth wheel and coupling construction, and it consists of the novel features more fully set forth in the specification and pointed out in the claims.

Motor vehicle trailers have lately come into wide-spread use on account of the economy of transportation involved, since a single truck may be used for hauling a number of trailers, the truck being released while the trailer is either loading or unloading, the power unit of the transportation train being at all times employed instead of standing idly by, as is the case when the power unit is embodied in the carrier (truck body) itself. In order to facilitate the coupling and uncoupling of the truck and trailer, automatic couplings of various types are employed. However, the majority of the couplings now in use are complicated and cumbersome and, at the same time, do not possess the flexibility essential to the smooth operation of the coupled parts.

In the present invention I have sought to simplify the coupling construction, at the same time embodying in it the means of providing a flexible connection between truck and trailer. Among the advantages of the present invention are the complete separation of the coupling mechanism (except the king-pin) from the fifth wheel, the former being embodied in a self-contained unit that may be attached to any truck while the latter is carried on the front of the trailer frame. The trailer is thus rotatably mounted upon the truck, the plane of rotation being the plane of separation between trailer and truck so as to facilitate turning of the truck and trailer assembly. The trailer is angularly movable in a vertical longitudinal plane by virtue of the fifth wheel being pivotally connected to the trailer frame, and means for permitting lateral tilting of the trailer frame is also embodied in the fifth wheel construction. The advantages of the features just pointed out are obvious. For instance, the free angular movement of the trailer with respect to the truck permits drawing the trailer over ground on a different level than that on which the truck is on, as when the truck and trailer assembly crosses a ditch. The lateral tilting permits of movement by the trailer frame due to uneven terrain without imposing stresses on the anti-friction center bearing, or king-pin.

It is a further object of the invention to simplify fifth wheel and coupling construction by incorporating all the flexibility of the connection in the trailer—the turning movement, and both longitudinal and latitudinal tilting are effected in the fifth wheel construction carried by the trailer. All the coupling mechanism, except the king-pin, is embodied in the coupling platform carried by the truck. This complete separation of the elements of flexibility from the coupling elements, obviously, makes for simplicity and certainty of operation.

That I have accomplished my object of simplicity in construction should be further apparent from the fact that only three moving parts are comprised in the coupling mechanism, aside from the king-pin carried by the fifth wheel on the trailer. These advantages, as well as others inherent in the invention, will be better apparent from a detailed description thereof in connection with the accompanying drawings, in which:

Figure 1 is a side elevation of a truck and trailer (with parts broken away) embodying my improved fifth wheel and coupling, which are shown in assembled position; Fig. 2 is a side elevation of the rear end of a truck and the front end of a trailer which are about to be coupled together; Fig. 3 is an enlarged top plan of the trailer fifth wheel connected to the coupling mechanism mounted on the truck; Fig. 4 is an enlarged top plan of the fifth wheel, which carries the king-pin, disconnected from the truck; Fig. 5 is a top plan of the fifth wheel receiving platform and coupling mechanism associated therewith, which is carried on the rear end of the truck frame; Fig. 6 is a vertical cross-sectional detail taken on the line 6—6 of Fig. 4; Fig. 7 is also a vertical cross-sectional detail taken on the line 7—7 (at right angles to the section of Fig. 6) of Fig. 4; Fig. 8 is a vertical cross-sectional detail taken on the line 8—8 of Fig. 7; Fig. 8a is a top plan of the upper housing member for the fifth wheel anti-friction bearing; Fig. 9 is a vertical cross-sectional detail taken on the line 9—9 of Fig. 7; Fig. 9a is a top plan of the hub of the fifth wheel ring which serves as the lower housing member for the anti-friction bearing; Fig. 10 is an enlarged top plan of the truck coupling mechanism with parts of the receiving platform broken away, said mechanism being set for automatically engaging the king-pin of the trailer; Fig. 11 is a vertical longitudinal section through the truck coupling mechanism taken on the line 11—11 of Fig. 10; Figs. 12, 13 and 14 are vertical cross-sectional details repectively taken on the lines 12—12, 13—13 and 14—14 of Fig. 11; Fig. 15 is a top plan of that part of the coupling mechanism showing the rotatable jaw and lock-bar therefor in engagement to permit the ready withdrawal of the king-pin when truck and trailer are being uncoupled; Fig. 16 is a side elevation of the lock-bar for the rotatable jaw showing the side carrying the lug for engagement with said jaw to hold it clear of the king-pin while the latter is being disengaged therefrom; Fig. 17 is a top plan similar to that shown in Fig. 10, except that the coupling mechanism is shown in position for engagement with the king-pin of the trailer; Fig. 18 is a vertical longitudinal section taken on the line 18—18 of Fig. 17; and Fig. 19 is a cross-sectional enlargement of the center bearing shown in Fig. 7 with parts broken away.

Referring to the drawings, T represents a truck, to which is coupled a trailer T' by means of my improved fifth wheel and coupling, the fifth wheel and king-pin being carried at the forward end of the trailer T', and the coupling mechanism being mounted in a platform frame 1 secured to the frame of truck T by means of suitable clamps 2, 2, sills 3, 3 and bolts 4, 4. Since the clamps 2 and sills 3 merely facilitate the securing of the platform frame 1 to the truck and do not constitute a part of the invention itself they will not be further alluded to. The invention will best be understood by first describing the fifth wheel construction and coupling construction separately, after which the operation will be explained.

*Trailer fifth wheel*

The trailer T' is of the usual construction, comprising a vehicle frame 5 supported by rear wheels 6 and having, under the forward end, prop wheels 7 for supporting the forward end of the trailer when it is disconnected from the truck for loading, or unloading, purposes. A pair of brackets 8, 8 are secured to the outer faces of frame members 5', 5', said brackets each having spaced bearing elements 9, 10 beneath each side member 5'. A pintle 11 is mounted in the bearings 9 and 10 and carries a freely rotatable roller 12 disposed in the space between the bearings. Obviously, both side members 5', 5' carry similar brackets 8, 8, and, since they are identical, a description of one will serve. The inner ends of the oppositely disposed pintles 11, 11 traverse castings 13, 13, which serve to connect, in spaced relation, channels 14, 14, said channels and castings together constituting a unitary yoke structure which is capable of rocking on a transverse axis, as defined by the pintles 11, 11. A bearing block 15 is secured at the center between the channels 14, 14 by a plurality of rivets 16, 16, the lower surface of the bearing block being provided with a circular depression 17 to receive the correspondingly shaped rib 18 formed on the upper surface 19 of anti-friction bearing housing member 20. Housing member 20 is provided with opposite upwardly projecting flanges 21, 21 adapted to embrace the lower flanges of channels 14, 14, and said housing member 20 is also provided with a depending annular flange 22 for enveloping upwardly projecting annular flange 23 formed at the center of fifth wheel ring 24. A boss 25 is concentrically formed with the flange 23 and is provided with an opening 26, through which the reduced portion 27 of king-pin 28 passes. Within the annular channel 29, formed between boss 25 and flange 23, is an anti-friction bearing (roller bearing) 30 the lower raceway 31 thereof being seated in the channel 29; the upper raceway 32 is in frictional engagement with the inner face 33 of housing member 20 supported on said upper raceway 32. The fifth wheel ring 24, housing 20 and bearing block 15 are held in intimate relation by means of a coiled spring 34 around the upper part of king-pin 28, the tension on said spring being adjustable by means of a nut 35, screw threaded over the upper end of the king-pin. The bearing block 15 is traversed by an opening 36, which tapers outwardly toward the top so as to permit the bearing block (and, of course, the entire trailer frame) to rock laterally on the rib 18 of housing member 20. Obviously, clearance must also be provided between the yoke and the upper surface 19 of member 20. This is accomplished by crowning the surface 19 slightly, as shown (Fig. 19). The shoulder 27', formed between the portions 27 and 28 of the king-pin, engages the under side of the fifth wheel ring and thus maintains this ring in intimate contact with the housing member 20, so that the enlarged portion 28 of the king-pin will always extend downwardly beyond the ring 24 for engagement with the coupling mechanism mounted on the truck, which is now about to be described.

It is apparent that the rotation of the yoke 13, 14 in bearings 9, 10 permits of tilting of trailer T' relative to the truck T without imposing any strains on the king-pin 28, which at all times remains perpendicular to the fifth wheel base 24.

*Trailer coupling mechanism*

The platform frame 1 comprises transverse channels 40, 40, between which extend longitudinally disposed channels 41, 41 and 42, 42, between which latter pair of channels the coupling mechanism about to be described is mounted. A platform comprising similar sections 43, 43 is secured (by rivets or otherwise) over the channels comprising the frame 1, said sections 43, 43 being in spaced relation and having diverging forward edges 44, 44, at the outer ends of which are downwardly turned flanges 45, 45 to facilitate the entry of king-pin 28 during the act of coupling the trailer and truck. The triangular space M between plates 43, 43 serving to guide the king-pin 28 into slot s between the plates. An open box 46 is disposed between channels 42, 42, said box having its end 47 (which is adjacent to the flaring mouth M of the platform) provided with a recess 48, on each side of which flanges 49, 49 are formed contiguous to the upper edge of the box whereby it may be riveted to platform sections 43, 43. The opposite end 50 of the box is also provided with a flange 51 on its upper edge, which is riveted to sections 43, 43. It will be observed that the rear frame channel 40 is also provided with a recess 52 of the same width as the flaring mouth at this point to provide a passage for the king-pin 28, and entry of said king-pin into the box 46 for engagement with the coupling members therein, as will be more fully pointed out hereinafter.

The sides 53, 53 of the box 46 are provided with oppositely disposed recesses 54, 54 in their upper edges, said recesses extending from the end 50 rearwardly approximately one-half the length of the box, and a sliding jaw plate 55 is disposed within the box with its edges in said recesses, the plate having downwardly extending flanges 56, 56 to serve as guides to insure rectilinear movement of the plate in the recesses. This movement is possible because the recesses are slightly longer than the plate 55. A semi-circular recess 57 is formed at the middle of the rear edge of plate 55, said recess serving as one of the confining jaws for the king-pin 28 when the latter is locked in engagement with the coupling mechanism. There is a second jaw 58, also semi-circular in shape, projecting from arm 59 of a jaw lever 60 fixed on a rod 61 rotatably mounted in openings 62, 62, traversing side walls 53, 53 of the box 46. Said rod also traverses an opening O in one of the channels 42. The axis of rotation of the jaw lever 60 is so disposed with respect to the plate 55 that when the jaw lever is rotated under the influence of springs 63, 63, secured to lugs 64, 64 on the lever 60, and 65, 65 on the plate 55, the jaw 58 will be raised into opposing relation with the jaw 57. Obviously, the tendency of the springs 63, 63 is to maintain the jaw lever 60 in a position with its jaw 58 elevated and the plate 55 moved toward said jaw. Therefore, the lever 60 is provided with an arm 66 extending opposite to the arm 59, and the plate 55 has a downwardly and forwardly extending lug 67 against which the lever arm 66 impinges when the plate 55 is in its forward position, thus holding lever 60 in a substantially horizontal position with its jaw 58 depressed. This is the relative position of lever 60 and jaw plate 55 when they are set to permit the coupling of a trailer to the truck carrying the coupling mechanism (Fig. 11).

When the truck is backed into the trailer so as to cause king-pin 28 to pass through notches 52 and 48 and enter the box 46, said king-pin will clear jaw 58 of lever 60 and impinge upon the jaw 57, forcing plate 55 forwardly in its recesses 54, 54. This movement of the plate 55 will release lever arm 66 from the lug 67 of the plate and allow springs 63, 63 to rotate the jaw lever 60, raising jaw 58, which will swing upwardly behind king-pin 28 and envelop the same, so that the king-pin will then be confined between jaws 57 and 58, as shown in Fig. 18. However, the mere engagement of the jaw 58 with the king-pin 28 is not sufficient to securely couple the king-pin, for which reason a lock-bar 68 is provided.

The bar 68 is mounted by means of suitable lugs 69, 69' on a rod 70, the rod in turn being slidably mounted in openings 71, 71 in the sides 53, 53 of box 46, and the rod traversing openings 72, 72 in channels 42, 42. The bar 68 is disposed immediately beneath plates 43, 43 and is adapted to traverse aligning recesses 73 and 74 formed in channel 42 and the upper edge of the adjacent box side 53. Lugs 49, 49 are extended inwardly so that their inner edges are in line with the adjacent edge of slot 74 whereby said lugs will form abutments for the bar 68 when the bar is moved to its locking position (Fig. 17) behind the jaw lever 60. An offset 49' is provided for the lug 49 that engages with the inner end of lock-bar 68, the said offset forming a seat for this end of the lock-bar. Rod 61 is provided with a handle 61' whereby it may be manually rotated, and rod 70 is provided with a handle 70' whereby it may be pulled outwardly to withdraw lock-bar 68 from behind jaw lever 60. However, a coiled spring 75 envelops the inner end of bar 70 and is confined between channel 42 and a pin-held washer 76 at the end of rod 70. The function of spring 75 is to urge the rod 70 inwardly and move the lock-bar automatically into locking position behind jaw lever 60.

By referring to Figs. 17 and 18 it will be observed that a lug 59' is formed on one side of arm 59 of jaw lever 60, said lug having a cam surface 77 formed on the side adjacent to the lock-bar 68 when the lever is in an upright position. When the parts are set to receive king-pin 28 (as shown in Figs. 10 and 11) a lateral projection 78 on the lower edge of lug 69 bears against the cam surface 77 of lug 59', lug 59' thus serving as an abutment to hold lock-bar 68 in its withdrawn or set position. The jaw lever 60 may also be held in its depressed position by causing the projection 78 to engage the end of lug 59' (as shown in Fig. 16). When the jaw lever 60 is thus held, plate 55 may be moved forwardly to disengage the lug 67 from lever arm 66 without releasing jaw lever 60. The advantage of holding the jaw lever depressed by engagement with the lock-bar will appear when the operation of the invention is described. When the operator sets the jaw lever by rotating rod 61, said lever is prevented from being rotated into an inoperative position by a stop-bar 79 welded, or otherwise secured, across the bottom of the box 46 so that the arm 59 of jaw lever 60 will be limited in its downward movement by said stop-bar.

*Operation of the coupling*

When trailer T' is to be coupled to the truck T, the latter is backed into the front part of the trailer so that the downwardly inclined ends 43', 43' of the platform, comprising the sections 43, 43, will come under the fifth wheel ring 24. As the truck T continues to approach the trailer T' said ring 24 will ride upwardly on the platform sections 43, 43, and the king-pin 28 will pass through the mouth M and enter the slot s between platform sections 43, 43. The pivotal mounting of the fifth wheel assembly in brackets 8, 8 permits tilting of the fifth wheel ring 24 as it rides onto the truck platform (as Fig. 2). If, now, the backing movement of the truck is continued the king-pin 28 will pass through slots 52 and 48 and will pass over the jaw 58 of jaw lever 60 (since the parts are set as shown in Figs. 10 and 11), said king-pin finally impinging upon the jaw 57 of the plate 55 and sliding said plate forward, causing the lug 67 to release the lever arm 66, whereupon the lever arm 58 will swing upwardly under the influence of springs 63, 63 until the jaw 58 envelops the king-pin. As the lever arm 59 moves upwardly, lug 78 of lock-bar 68 will slide over the cam surface 77 of lug 59' until the lever arm 59 is out of the path of the lock-bar 68 when said lock-bar will be moved into its locking position behind lever arm 59 under the influence of spring 75, as shown in Figs. 17 and 18. The stresses imposed on the jaw 58 by the pulling of the trailer are thus transferred from said jaw to lock-bar 68, which is in turn solidly held by the inner edges of flanges 49, 49. I thus have an absolutely rigid and unyielding construction whereby very heavy loads may be hauled without imposing any strain whatsoever on the coupling mechanism.

When the trailer is to be uncoupled from the truck, the operator (who may be the truck driver) takes hold of handle 70' and withdraws the lock-bar 68 from behind the jaw lever and then manually rotates bar 61 to depress the lever arm 59, after which he releases lock-bar 68 sufficiently to cause lug 78 to engage lug 59', as shown in Fig. 15. The same operator is now free to drive the truck away from the trailer as the jaw 58 is held in its depressed position by the lock-bar.

The truck driver may now back the truck up to another trailer for the purpose of coupling said truck and trailer. However, before proceeding further with the coupling operation he resets the jaw lever 60 by releasing it from the lock-bar 68, whereupon the jaw lever will be held in its depressed position by lug 67, which slides beneath lever arm 66 when the plate 55 slides rearwardly as the truck is driven away from the king-pin 28. Now, only the lug 67 holds the jaw lever 60 in its depressed position, said lever in turn holding the lock-bar 68 outwardly and as the king-pin is caused to enter the box 46 to impinge on jaw 67 the plate 55 will again be pushed forward to release jaw lever 60 and lock-bar 68 to complete the coupling operation.

When the truck and trailer are being drawn over uneven terrain, such as when operations are carried out on the farm, or for hauling materials used in construction work, the free cradling action of the yoke, comprising members 13, 13 and 14, 14, permits of a wire vertical angular movement between trailer and truck. This permits the trailer to be pulled over gulleys and ditches and other places impassable to truck and trailer combinations which do not possess such flexibility in the coupling. Also, the lateral tilting of the trailer frame is provided for by the fulcrum support of the yoke on the housing member 20. Of course, this lateral tilting is limited by the engagement of either roller 12 with the fifth wheel ting 24. The anti-friction center bearing 30 permits of smooth and easy turning operation of truck and trailer and the location of the plane upon which the turning is effected, above and clear of the truck T provides a wide turning angle to further facilitate the operations of the truck and trailer combination. In many of the couplings now in use the plane upon which turning is effected is below the supporting platform for the trailer, hence the turning angle is limited by obstructions. The dotted position indicated in Fig. 1 shows that even when the trailer is inclined a considerable extent with respect to the truck it is still clear of the truck supporting platform and the bearing remains in a horizontal plane so that turning may still be effected.

It is, therefore, apparent that, in addition to the simplicity of construction, my improved fifth wheel and coupling is operable in almost any position truck and trailer may assume in practice, and the coupling possesses flexibility of movement to a marked degree.

Having described my invention, I claim:

1. In a coupling mechanism for a tractor and trailer, said mechanism including a jaw plate slidably mounted, a jaw lever for co-operation therewith, and a lock-bar for said lever, co-operative elements on the jaw plate and lever for holding them in position to receive a king-pin, co-operative elements on the jaw lever and lock-bar for holding the lock-bar in set position, said jaw plate being movable by engagement with the king-pin to release the jaw lever, and means for moving the lock-bar to locking position when the jaw lever is released.

2. In a coupling mechanism for a tractor and trailer, said mechanism including a sliding jaw, a jaw lever for cooperation therewith, cooperative elements on the jaw and the lever for holding them in position to receive a king-pin, means for locking said lever in engagement with the king-pin, means for holding said locking means in set position, said jaw being slidable by engagement with the king-pin to release the jaw lever, and means for actuating the locking means when the jaw lever is released.

HOMER F. FELLOWS.